(12) United States Patent
Pernestål

(10) Patent No.: US 7,421,378 B2
(45) Date of Patent: Sep. 2, 2008

(54) POWER SIGNATURE DIAGNOSING

(75) Inventor: Kjell Pernestål, Uppsala (SE)

(73) Assignee: PSD Insight AB, Uppsala (SE)

( * ) Notice: Subject to any disclaimer, the term of this patent is extended or adjusted under 35 U.S.C. 154(b) by 356 days.

(21) Appl. No.: 10/513,476

(22) PCT Filed: May 7, 2003

(86) PCT No.: PCT/SE03/00733

§ 371 (c)(1),
(2), (4) Date: Aug. 15, 2005

(87) PCT Pub. No.: WO03/095961

PCT Pub. Date: Nov. 20, 2003

(65) Prior Publication Data

US 2006/0217898 A1    Sep. 28, 2006

(30) Foreign Application Priority Data

May 8, 2002    (SE) .................................. 0201407

(51) Int. Cl.
*G06F 17/10* (2006.01)
(52) U.S. Cl. ................. 703/2; 703/18; 702/60
(58) Field of Classification Search ...... 703/2, 703/6, 18; 702/60, 61
See application file for complete search history.

(56) References Cited

U.S. PATENT DOCUMENTS

| | | | |
|---|---|---|---|
| 3,832,534 A * | 8/1974 | Carlson et al. ............ | 703/18 |
| 4,888,996 A | 12/1989 | Rak et al. | |
| 4,965,513 A | 10/1990 | Haynes et al. | |
| 5,594,175 A | 1/1997 | Lyon et al. | |
| 5,748,469 A | 5/1998 | Pyötsiä | |
| 5,754,450 A | 5/1998 | Solomon et al. | |
| 5,995,910 A | 11/1999 | Discenzo | |
| 6,502,458 B1 | 1/2003 | Krüger et al. | |

FOREIGN PATENT DOCUMENTS

| | | |
|---|---|---|
| WO | WO 96/30684 | 10/1996 |
| WO | WO 99/05501 | 2/1999 |

OTHER PUBLICATIONS

Somayajula et al., S. Analog Fault Diagnosis Based on Ramping Power Supply Current Signature Clusters, IEEE Transactions on Circuits and Systems—Analog and Digital Signal Processing, vol. 43, No. 10, Oct. 1996, pp. 703-712.*

* cited by examiner

*Primary Examiner*—Russell Frejd
(74) *Attorney, Agent, or Firm*—Holland & Bonzagni, P.C.; Mary R. Bonzagni, Esq.

(57) ABSTRACT

In a diagnosing method for an apparatus having movable mechanical components and a diagnosing device, an instantaneous total supply of power is measured and recorded as a function of time. A dynamic physical power-flow model of the driven apparatus is created. The model is described by means of parameters directly connected to mechanical and/or electromagnetic quantities of the individual components of the apparatus. The parameters are adapted to fit the power consumption calculated from the model to the recorded power signatures. A diagnosis is performed based on the adapted parameters. The diagnosing device has a power meter and a processor, the processor being arranged for: obtaining a power signal representing supplied power as a function of time; providing the dynamic power-flow model; and adapting values of model parameters of the dynamic physical power-flow model to fit signatures of said power signal and for diagnosing the apparatus.

38 Claims, 5 Drawing Sheets

POWER SIGNATURE DIAGNOSING

TECHNICAL FIELD

The present invention relates in general to monitoring the status of mechanical apparatuses and in particular to diagnosing of operation of movable mechanical parts in a mechanical apparatus.

BACKGROUND

Apparatuses having movable mechanical parts are present in most industrial contexts. A typical such apparatus has some kind of motor or actuator acting on a body that is movable in a translational and/or rotational sense. The body may interact with other mechanical parts or components in order to perform one or more predetermined tasks. These tasks may be of various types, e.g. closing a valve, moving a part between two predetermined positions, applying a force, adjusting positions, compression of gases, pumping of fluids, rotating filters, fans etc.

Monitoring of mechanical apparatuses for the purpose of detecting signs of maintenance need or erroneous operation is requested in many areas. Emergency faults typically involve large costs in terms of production losses, spare parts and short-notice labour costs. An early detection of e.g. wear or faults may allow any maintenance operations to be performed in a well-planned manner, and may reduce the actual damage caused in the apparatuses. A common approach is to supply the apparatuses with different kinds of sensors, measuring vibrations, torques, forces, temperatures, pressures, sound etc. The sensors are then connected to a monitoring or diagnosing equipment performing an evaluation of the measured quantities.

In many industrial applications, mechanical apparatuses are sometimes present in areas with hazardous or aggressive environments, in limited spaces or simply in positions which are difficult to reach from outside. In such cases, it may be difficult to provide sensors directly on the apparatus or connections to the evaluation devices. A remote monitoring or diagnosing is thus required.

When mechanical equipment is re-mounted when being opened for inspection, there is a finite probability that the mechanical equipment is not in operative condition or its settings for proper operation have been changed. In purpose to avoid future need of maintenance to correct the introduced errors it is valuable to find such errors in advance.

In the U.S. Pat. No. 4,965,513 is a motor current signature analysis method disclosed. A current supplied to an electrical motor driving e.g. a valve is measured at a position remote from the actual motor. The current signal is analysed in the frequency domain, i.e. in principle a vibrational analysis. The frequency spectrum comprises typically a number of more or less pronounced peaks, which are possible to relate to mechanical parts performing a periodic motion. By comparing the amplitudes of the frequency components in a spectrum with a spectrum recorded when a fault-free operation was assured, trends may indicate abnormalities or degradation. There are some remaining problems with the method disclosed in U.S. Pat. No. 4,965,513. Non-periodic motions are not possible at all to monitor or evaluate and the evaluation is basically performed as an associative evaluation, i.e. comparison with earlier spectra, which means that even if some trends are detected, there is basically no detailed information about what fault signal really is present.

Also the monitoring system disclosed in WO 99/05501 is based on an analysis of cyclical tasks. The power consumption as a function of time is compared with pre-determined upper and lower limit thresholds. The number of crossings of the thresholds is counted and evaluations are performed based on these figures and according to pre-determined sample recordings for a set of known faults. Here, the system is trained for a specific task by measuring the operation at well-defined situations. The analysis is a pure associative procedure. This implies that the total system has to be rather simple, in order to be able to cover possible behaviours. Also, all faults that are requested to be identified have to be caused on purpose and measured in order to provide the associative sample recordings.

The U.S. Pat. No. 4,888,996 describes a method and a device for registration of the work performed when a DC motor operates a valve. The mechanical output torque is determined by registering the electrical power supplied to the motor and compensating for electrical losses in the motor. The output torque, or a quantity proportional thereto is monitored as a function of time. A series of events can be monitored and interpreted as different operational phases. Certain quantities related to the state of the valve and its operation are possible to diagnose by relating the main features of the output torque curve to the course of events occurring when operating the valve. However, the analysis is based on simple and well-known models related to dimensioning of actuators.

The analysis in U.S. Pat. No. 4,888,996 is based entirely on static interpretations of the valve as one collective item. Such analysis is typically based on differences between different operation phases, where different sets of movable parts are in operation. Referring to FIG. 6 in U.S. Pat. No. 4,888,996, "c" refers to a duration of a first operation phase, "a" refers to a difference in collective average load between a fourth and second operation phase, "b" again refers to a duration of an operation phase, in this case the fourth one and "d" refers to the total load at the onset of the sixth operation phase. All such parameters are closely linked to changes in operation phase and are based on a collective view of the system. Although some information about the actual existence of operation problems is possible to extract, it is not possible to conclude what the details causing the problem are.

The U.S. Pat. No. 5,748,469 discloses a method of detecting errors in components in an automatically operated valve. A mathematical model of a control valve assembly is defined. The mathematical model is fitted to data that consists at least several values of a control signal and corresponding values of a position of the control valve. The analysis is thus based on a response analysis between an input signal and a resulting behaviour of a measured quantity, in this case a position. For deeper analysis, further measured data are needed. Certain parameters of the mathematical model are selected as "critical" parameters. The "critical parameters" are supposed to be mainly dependent on a part system, which is why the occurrence of errors readily may be detected to a certain part system if the associated critical parameter changes considerably.

The method is entirely dependent on a measured position as well as a control signal as an input, which as discussed above is unacceptable in many applications. The model is further based on a collective approach, i.e. where the valve-operating device is considered as one unit having statistically averaged properties that can be expressed as parameters. This is emphasized in that e.g. one single friction coefficient is used that is only dependent on the rotational angle. Furthermore, a reduced mass is used for the piston, i.e. a weighted averaged value of different interacting masses. Also a combined inertia moment for the valve and piston is used. Such a model thus enables a description of the behaviour of the valve system as one integrated single item. However, even if such errors may be detected and associated to a certain part system, such models do not provide any means to efficiently precisely localise the error within the part, and certainly not to estimate any error sizes.

SUMMARY

An object of the present invention is thus to provide a method and a device for monitoring of a mechanical apparatus, which is capable of remote diagnosing without extensive learning procedures. Another object of the present invention is thus to provide a method and a device which are capable of diagnosing all kinds of motions, periodic as well as aperiodic motions. A further object of the present invention is thus to provide a method and a device which identifies the origin of most fault types, localizes it within single components of the device and preferably also quantifies the size of the fault.

The above objects are achieved by methods and devices according to the enclosed claims. Preferred embodiments are characterized in dependent claims. In general terms, the instantaneous supply of power to a driving machine is measured and recorded as a function of time. Based on solely mechanical design considerations, a dynamic physical power-flow model is created. The model represents a description of a dynamic power flow within each one of a number of operation phases. The power flow in at least one of the operation phases is at least partly aperiodic. The dynamic model is described by means of parameters directly connected to mechanical and/or electromagnetic quantities of at least two components, movable relative to each other, of the apparatus as well as the power interaction between these components. The parameters are adjusted in order to fit the model to the recorded power signatures. A diagnosis is performed based on the adapted parameters. Since the entire model is based on design considerations, i.e. is non-associative, no learning phase is necessary. The power signatures are analysed within separate time domains, associated with different operation phases of the apparatus operation. The model preferably comprises components associated with ideal operation as well as of possible predicted faults.

Preferably, occurrence time, instantaneous amplitude, phase and power level, as well as position, time evolution and duration can be used in the parameter adaptation procedure. Initial values for the parameters are preferably determined from ideal operation conditions. If a parameter falls outside a pre-determined range, an operator may be notified and informed about the fault, preferably with detailed information regarding e.g. position and magnitude of the fault.

Supply of electrical, mechanical, pneumatic as well as hydraulic power can be used as a base of the diagnosis.

One of the main advantages of the present invention is that diagnosis can be performed without use of any pre-determined reference measurements. Furthermore, all types of time dependent motions are possible to detect.

Knowledge of the technical status of an apparatus opens also for new ways for process and economical optimisation as it is possible to follow the internal status when in operation. Hence new process optimisation parameters are available.

BRIEF DESCRIPTION OF THE DRAWINGS

The invention, together with further objects and advantages thereof, may best be understood by making reference to the following description taken together with the accompanying drawings, in which.

DETAILED DESCRIPTION

Consider a machine having a motor driving a number of mechanical moveable parts. The power flow supplied to the machine is solely dependent on the power-requiring processes within the machine. The power flow into the machine is therefore directly related to all power-consuming, power-storing or power-releasing processes within the machine, modified with a certain time constant. These processes can be described as a number of coupled partial differential equations. The partial differential equations can be designed using the electrical and mechanical properties of the machine. Solving this set of equations gives generally periodic, transient, aperiodic and time dependent solutions.

Periodic solutions are the easiest to identify. By using different frequency analysis techniques, periodic variations can be determined. There is a considerable degree of orthogonality between the periodic solutions, although there are some crossover terms and hence preliminary solutions can be found. By using iteration, the crossover terms can be found. Hence, periodic solutions can easily be allocated to different parts of the machine.

Transient solutions will appear at special occasions and are typically directly connected with the beginning or end of a specific motion phase. An identification of such transient solutions is therefore easy to perform by just considering the motion pattern.

Aperiodic solutions, not necessarily transient, are typical for certain motional modes or processes. An identification of the onset and end of the aperiodic solutions can therefore normally be associated with the expected motional modes.

By measuring the total power flow into the machine, the superposed global result can be observed. By comparing the results from the measurement with model considerations, it is possible to identify the different signatures or characteristics to different motions or events within the apparatus. These motions and events correspond to a part to motions of separate components of the apparatus, which are movable in relation to each other. However, also the interaction between the separate components will show up in the power signatures. The power characteristics of one component will thus influence the power characteristics of other components directly or indirectly mechanically connected thereto.

Also expected fault situations can be comprised in the modelling. Identified deviations, not explained from the model can be used either for refining the model or as a base for an operator-supported evaluation.

By having possible fault situations included in the model, direct fault identification and in some cases also a measure of the magnitude of the fault can be achieved.

Time independent solutions (or actually slowly time dependent solutions) are more complex to handle, since the contribution to the power flow of different parts just will add. Under certain circumstances it is possible to identify these solutions, e.g. when it is known that some of the contributions are known to their magnitude, e.g. when they take the value of zero. Contributions, which are time independent during different parts of the entire motion, can thereby be identified.

Mechanical processes in general are fairly well understood. By using mechanics relations, it is possible to determine power consumption in different part systems. A model of power consumption can thus be created, typically based on geometry, masses, friction etc of the single components. From drawings, the ideal motion of the different single components by themselves and in interaction with each other can be deduced. Hence, a dynamic power-flow model can be established, representing the dynamic power flow within the system. Such a model can be expressed using model parameters, which are directly connected to mechanical or electromagnetic properties of different components in the apparatus as well as the dynamic interaction between them. By fitting the expected power consumption of the model to a recorded supply of power, letting the parameters be adjusted, a basis for diagnosis is formed. The information contained in the adapted sets of parameters includes directly identifiable detailed information concerning physical properties of the apparatus, i.e. deviations from ideal operation.

Figure 1:
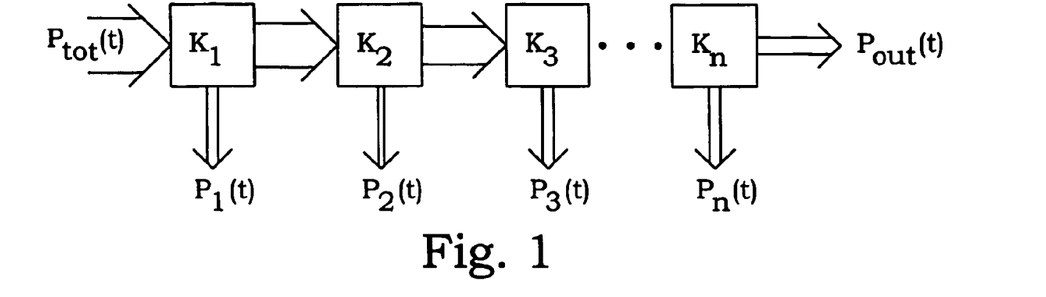
FIG. 1 is a power-flow diagram of an apparatus with movable mechanical components.

In FIG. 1, a schematic illustration of power flows in a mechanical system is shown. The machine is illustrated by a number of components C1 to Cn. The last component Cn performs some work corresponding to an outgoing power of $P_{out}$, which in a general case is time dependent. The actual operation of component Cn is associated with certain power losses, e.g. due to friction. This power $P_n$ is lost from the system without contributing to the useful power. The component C(n-1), in front of Cn, has to provide a power to Cn, which is equal to the sum of $P_{out}$ and $P_n$. Furthermore, the operation of component C(n-1) is also associated with a power loss $P_{n-1}$. By summing all power losses and the useful outgoing power on ends up with a the equation:

$$P_{tot}(t) = \sum_{i=1}^{n} P_i(t) + P_{out}(t)$$

All contributions are time dependent, and thus, the total power supplied to the system is also time dependent. Furthermore, every change in power consumption of any of the components will appear also in the sum. These powers also include energy that is stored in or retrieved from the system, temporarily or for longer periods of time, e.g. in form of kinetic energy of moving parts or potential energy in elastic components, such as springs. The total power is thus a representation of all power-related mechanisms in the entire apparatus, and contains therefore information of all these components as well as of the dynamic interaction between them.

In a first order approximation, only friction is considered. Other factors as mechanical energy stored in resilient members or similar is in this first approximation neglected. The friction power is typically proportional to the power transported through the component in question. If the friction power in component No. i is $P_i k_i$, the power equation can be rewritten as a product instead:

$$P_{tot}(t) = P_{out}(t) \prod_{i=1}^{n} (1 + k_i(t))$$
$$= P_{out}(t)(1 + k_1(t))(1 + k_2(t)) \ldots (1 + k_i(t)) \ldots (1 + k_n(t)).$$

From this it is seen that each friction coefficient will appear both as a single term of the type $Ck_i$ and in cross terms of the type $ck_i k_j$ and higher orders. C and c are constants. Hence the characteristics of the machine is found in the power.

The friction coefficient $k_i$ can in a general case have two contributions, one time dependent and one (at least piecewise) time independent part. The time independent parts will add and can in a mathematical sense not be separated. However, there are a number of ways to go around this problem. The first way is to model the static friction from design considerations, e.g. by using drawings. From experience it is known that it is likely that the static friction will not change without a corresponding change in the dynamic friction. By assuming that there is only one ground for a change in the static power, dynamic signals generated earlier in the power flow will increase as well, but not signals generated later. This will be illustrated further below. Another most useful way is to use the knowledge about the total apparatus operation. In many machines, all components are not active at the same time. Hence, if it is possible to identify the time domains within which different apparatus components are active, it is possible to separate also (piecewise) time independent contributions. In other words, the apparatus has different operation phases, employing different sets of components.

Let us consider a (fictive) model system. Four components are present. The first component is an electrical motor having a substantially constant efficiency $\xi$ independent on transmitted power. The second component has a time dependent friction component $k_2 = k \sin(\omega t + \phi)$. The third component has two power loss contributions. In an initial phase, the third component is inactive. When it starts to move it has initially a constant friction loss. During a certain time domain, there is an additional time-dependent power loss connected to resilient properties. After that time domain, the additional power loss disappears. Finally, the fourth component has a constant friction loss, starting when the additional power loss of the third component disappears.

Figure 2:
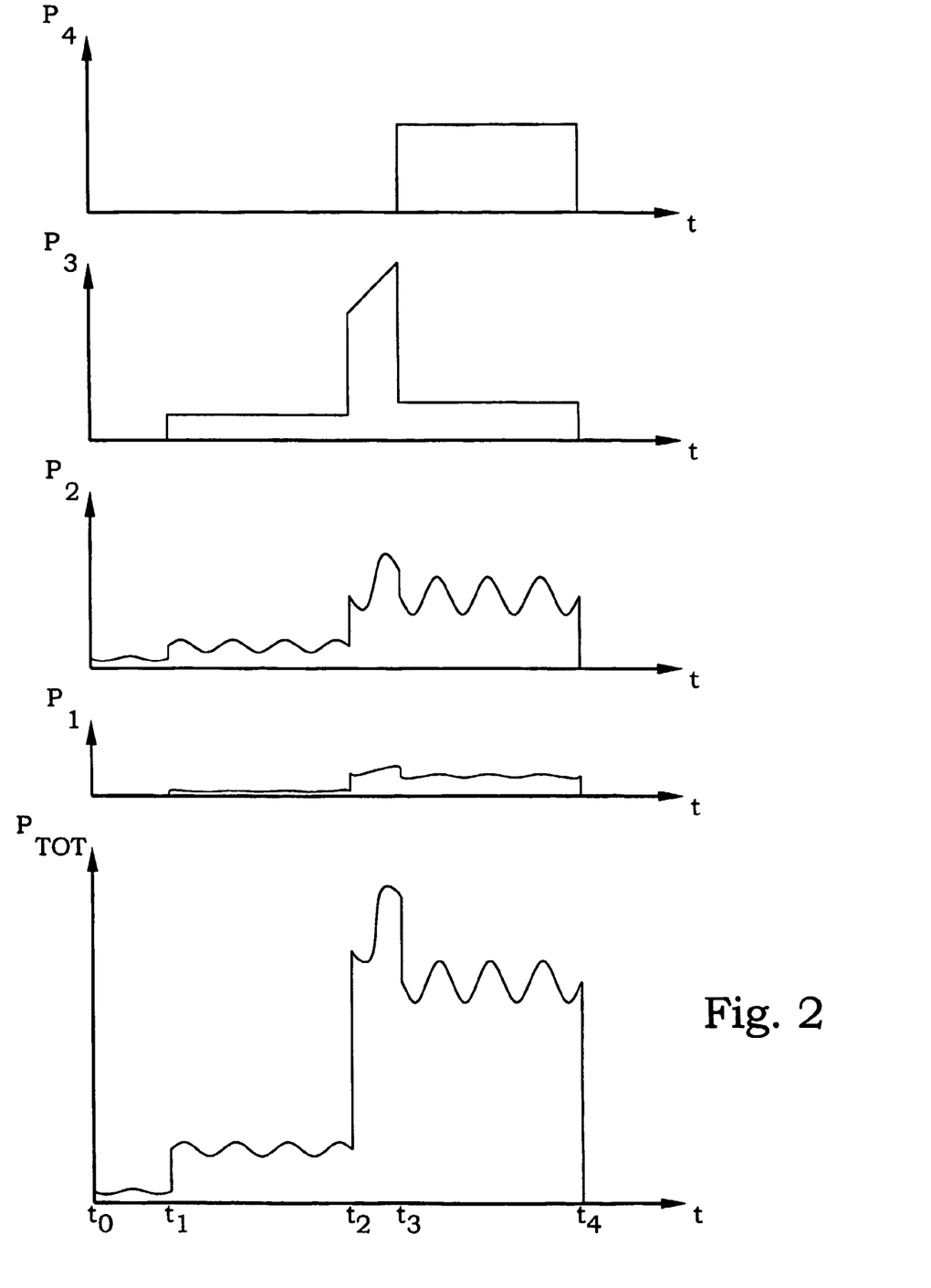
FIG. 2 is a series of diagram illustrating an example of power losses in different components of an apparatus.

FIG. 2 illustrates the power loss contributions of the different components, and at the bottom the power supplied to the apparatus. It is easily seen that the evolution of the power supplied to the apparatus comprises all information about the different components. Most of the operational function of the apparatus is obvious already by consulting the drawings and the main features are easy to predict by using basic mechanics and mechanical design practice. (This is basically in analogy with U.S. Pat. No. 4,888,996) According to the present invention, however, a dynamic physical power-flow model can be established, comprising a number of parameters representing mechanical or electromagnetic quantities for specifying the different components. For instance, component 2 may e.g. be a gear and the period of the fluctuations may then depend on e.g. diameters of gear wheels, number of teeth of gear wheels etc. The actual shape of the fluctuations as a function of time can be modelled by considering e.g. the actual shape of the gear teeth etc. More examples are given further below. The phase of the fluctuation will correspond to a start angular position of the gear. By building the model by such parameters with a strong physical connection, a fitting to the measured power signal signatures will provide useful direct information about the apparatus components.

From the total power signal, certain times, $t_0$ to $t_4$ in FIG. 2 below, are easily distinguishable. The time periods between these times correspond to different phases of the operation of the apparatus. By analysing each such time domain separately, the model can be simplified in many cases. In the first time domain, it is evident from design considerations that only components 1 and 2 will contribute with any power consumption. Parameters connected to these components may then be determined in this first time domain and be used in the analysis of the other time domains. In such a way, by using different operational phases, also power losses, which are time independent within each such time domain, can be separated.

Another example can be found in a tooth wheel gear. The mechanical forces between two teeth are a combination of tangential and radial working forces. There is also a sliding present between the teeth. The friction work will possess a periodic behaviour dependent on the instantaneous position between the teeth including the distance between the axis, the properties of the surfaces and their lubricants, and the transferred torque. If the teeth are worn their shape will change and hence the periodic friction pattern. If one tooth is partly ruptured, this will be seen as an incompletion in the periodic friction. If the lubricant film ruptures due to poor properties and/or to high pressure, the friction will change dramatically.

From FIG. 2, the mutual dependence between components is evident. It is thus an illustration of the product power equation presented further above. For instance, even though component 2 has properties described by "constant" parameters the contribution to the power signature will differ from one time to another depending on the behaviour of the other components. There is thus a dynamic interaction between the different components. This is most clearly illustrated by the diagram depicting $P_2$, where the influences from $P_3$ and $P_4$ are obvious.

The dynamic physical power-flow model is generally limited only by the time constants of the components of the apparatus, the accuracy of the power measurements, noise and the skill of the creator of the model. Here below, it will first be shown that typical time constants, accuracy and noise indeed allows anyone skilled in the art of basic mechanics to use quite detailed models. Then some examples of components and processes possible to resolve are presented. Finally, some examples of real apparatuses will briefly be discussed.

In order to investigate the possible model levels, a 3-phase induction motor apparatus has been selected as a model system. It is widely used and the supplied power is easily measured by conventional means. However, in principle other methods for determine the power flow to a machine can be used, e.g. in mechanical power transfers, pneumatic or hydraulic systems.

Figure 3:
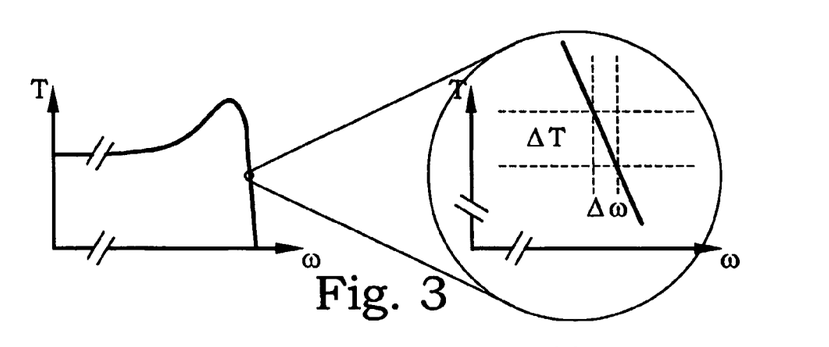
FIG. 3 is a diagram illustrating a typical relation between torque and angular velocity in an induction motor.

The induction motor can be considered as converter of electric energy to mechanical energy supplied on a rotating shaft and exhibit a simple relation between torque and angular frequency (although, if necessary, a much more advanced model can be designed including properties of magnetic materials, inductance of the windings etc.). An example of such a relation is illustrated in FIG. 3. A change in the mechanical load, i.e. torque, will cause a minor change in angular frequency. The change in angular frequency from zero to maximum load is typically 3-5%. This means that when the load changes, the energy in the rotating system will change as well, and this will set a limit to the bandwidth of the system.

The energy stored in the rotating system of the motor is given by $$W = \tfrac{1}{2} J \omega^2$$

where J is the moment of inertia and $\omega$ is the angular frequency. If there is a change in angular frequency due to a load change, the energy delivered from the rotating system is:

$$\Delta W = \tfrac{1}{2} J(\omega_1^2 - \omega_2^2) = \tfrac{1}{2} J(\omega_1 + \omega_2) \cdot (\omega_1 - \omega_2) \approx J \omega_1 \cdot \Delta \omega,$$

where $\omega_1$ and $\omega_2$ are the angular frequencies before and after the load change, respectively. Applying these relations to a typical situation, it is possible to get an idea of the resolution of the induction motor as a sensor. A typical 2-pole induction motor of 1 kW and $\omega=314$ rad/s, the moment of inertia is $J=0.0008$ kgm². If the torque increases 1%, the angular frequency $\omega$ decreases 0.0005. Hence, the change in energy in the rotating system is $\Delta W = 314 \cdot 0.0008 \cdot 0.0005$ J=13 mJ.

By comparing the change of the power of the system and the power that can be delivered by the rotating system in the motor, it is possible to establish a measure of an upper bandwidth (rise time) of the motor as a power sensor, e.g.

$$\Delta P_{Load} = \frac{\Delta W}{\Delta t}.$$

By using $\Delta P=1\%$ of max load in the motor, the duration $\Delta t$ of such a change is typically 10-15 µs. That is, the expected mechanical bandwidth is of the order of 20 kHz.

The total bandwidth will also be limited by the electrical bandwidth introduced by the inductance of the windings of the motor, however, no explicit estimation of such a contribution is calculated. Also the presence of other moving masses and elasticity in mechanical components, e.g. elastic joints and transmission belts, will reduce the bandwidth, unless incorporated in the dynamic model itself.

The power measurement on the 3-phase electrical machine is preferably performed as a true 3-phase power measurement, measuring both voltages and currents momentarily of all phases. The limitation in accuracy will then not depend on any models of the electrical system, but only on the resolution of the measuring system itself. By measuring in only one phase, or only the current, large uncertainties will be introduced and the reliability of the measurements is decreased considerably. Many aspects of the apparatus will in such cases be impossible to monitor. A true power measurement is thus of crucial importance for allowing the potential of the present invention to be used in full.

The lowest level for identification of signals is given by the noise. In principle, mechanical systems have a very low noise level on a macro scale. There are, however, a number of possible noise sources. Electrical noise is caused e.g. by imperfections in mainly the magnetic system. This noise is, however, periodic and can be filtered out quite efficiently. Noise due to e.g. power electronic components in the grid is usually related to the grid frequency and consists of fast and short transients. Third and higher order tones will usually only contribute to the thermal losses in the motor.

Mechanically induced noise is mainly due to mechanical resonance induced by vibration caused by working items and sliding surfaces. It is, however, good practice to design equipment to be free from resonance, that is, presence of a resonance can be an indicator of defective function. The motor picks up mechanically induced noise if it influences the power flow and, hence, gives additional information of the system if its source can be identified. The model can thus be expanded also to include a noise level, and in particular if it is concluded that the noise signal is correlated to some other action of the apparatus. It may therefore be possible to deduce useful information also from such mechanical noise, if an accurate model is created.

The flowing media in valves is another source of mechanical noise. If this noise influences the force in the stem, it will be detected: From mechanical design of the valve, its possible cause can be identified.

Thermally induced noise is not expected to cause any significant contribution. However, the temperature as such can be expected to influence on the properties of e.g. lubricated surfaces.

From the above discussions, it is now clear that the measuring of power supplied to an apparatus is a much more powerful and precise diagnosing tool than ever understood in prior art. With a 16-bit resolution of the power measurement, fluctuations of 10 mW in a 1 kW apparatus can be used for diagnosing purposes, which means that even very small power-affecting events can be tracked. In a typical case, frequencies up to at least 10 kHz are available, which includes most important mechanical motions.

Figure 4:
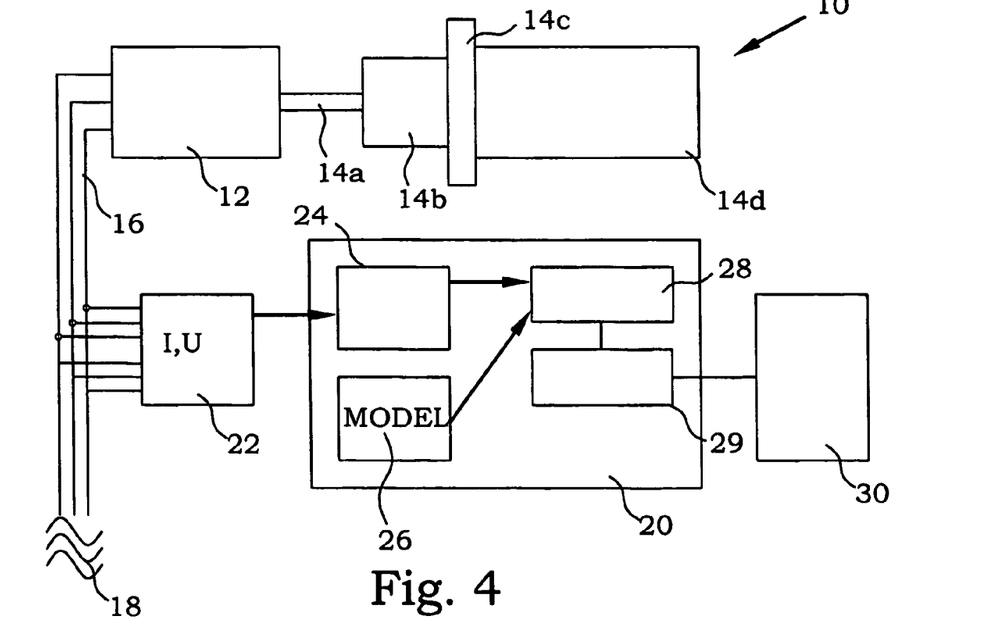
FIG. 4 is an embodiment of an apparatus according to the present invention.

FIG. 4 illustrates an apparatus having a diagnosing device according to an embodiment of the present invention. An apparatus 10 comprises a number of components 14a-d, which contribute to the power consumption. The components are originally driven by an electrical 3-phase induction motor 12. The motor 12 is supplied with electrical power through supply lines 16 from an electrical grid 18. A power meter 22 is arranged to measure instantaneous voltage and current in all phases in order to provide a true measure of the electrical power that is supplied to the motor 12 at each instant. A processor 20 is connected to the power meter 22 and receives either calculated power values, or a number of measured currents and voltages, whereby the processor performs the actual power calculation. The power is recorded by a recording means 24 as a function of time.

In the present embodiment, the processor 20 further comprises data storage means 26 having a representation of a dynamical physical power-flow model. The dynamical physical power-flow model represents a course of events of the apparatus 10. The course of events is at least to a part aperiodic. The dynamic physical power-flow model is described in terms of model parameters, which are directly connected to mechanical and/or electromagnetic quantities of the apparatus 10. The processor 20 also comprises an adaptation section 28, in which the model parameters are adapted in order to fit the model power consumption to the measured power signal signatures. The adaptation section 28 thus provides a set of parameters, which constitutes a set of actually determined physical quantities regarding the apparatus 10. These parameters are forwarded to a diagnosing section 29, in which the adapted parameters are compared with expected or allowed values, deduced from design considerations. In case any of the parameters obtains a value that is not compatible with an ideal operation of the apparatus, a signal is sent to an operator interface 30 for notify the discovered error. Possible embodiments of the operator interface and its functions are described more in detail further below.

The procedure of adaptation of model parameters in order to fit the model power consumption to the measured supplied power can be performed in many different ways. The most beneficial method is strongly connected with the type of apparatus and how the model actually is built. However, many fitting algorithms according to prior art are possible to use for achieving such adaptations. The choice of certain optimising algorithms and optimising criteria are preferably made during the design of the model.

In one embodiment, the initial parameters entered into the adaptation process are determined from normal design criteria and tolerances or from information from the designer. Another choice is to use the adapted parameters from a reference case or from the latest diagnosing having similar operating conditions.

The fitting or adaptation procedure may also consider different aspects of the power signal signatures. Since the apparatus operation is at least to a part aperiodic, many aspects are possible. In prior art associative methods, frequency and/or maximum amplitude are typically used. In the present invention, however, considering the power signal in a time domain, many aspects of the power signal signatures can be used for adapting the parameters. Some non-excluding examples are occurrence time, instantaneous amplitude, instantaneous phase, instantaneous power level, position, time evolution, and duration.

Furthermore, in many systems, there is a simple relation between time and position. For instance, in an apparatus having a screw transferring the mechanical power, the travelled distance of the moved components can easily be calculated by using the increment, angular velocity and time. The time scale of the power signal can in such a case instead be considered as a distance measure, and the analysis can be performed accordingly. If the angular velocity is power dependent a correction of such a change is made.

Figures 5A, 5B:
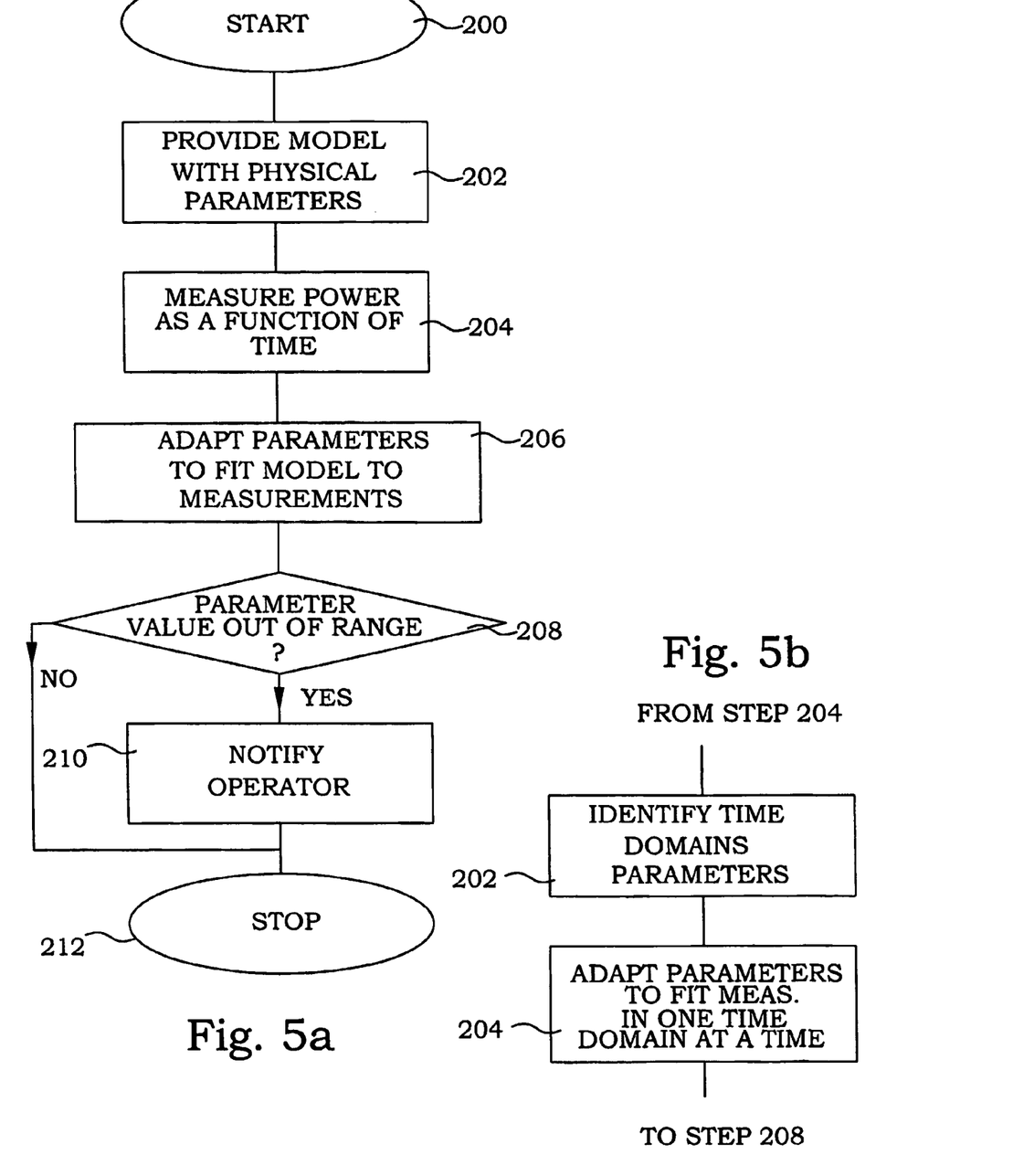
FIGS. 5a and 5b are flow diagram of embodiments of methods according to the present invention.

FIG. 5a illustrates the main steps in an embodiment of a method according to the present invention. The procedure begins in step 200. In step 202, a dynamic physical power-flow model is provided. The dynamic model is described entirely in terms of model parameters, which are directly connected to mechanical and/or electromagnetic quantities of mechanical components of the apparatus as well as the dynamic interaction between them. In step 204, the power supplied to the apparatus is measured and registered as a function of time. In step 206, an adaptation process takes place, in which the model parameters are adapted to give a model power consumption that resembles the measured power signal signatures as good as possible. This fitting procedure gives a set of adapted model parameters, carrying direct information about mechanical and/or electromagnetic properties of the apparatus. In a diagnosis step 208, the adapted model parameters are compared with allowed parameter ranges deduced from design considerations. If any adapted model parameter falls outside the allowed range, the procedure continues to step 210, otherwise the procedure is ended in step 212. In step 210, an operator is notified about the discovered discrepancy, preferably together with additional information connected to the fault in question.

FIG. 5b illustrates a part of a preferred embodiment of a method according to the present invention, particularly useful for more complex apparatuses. The procedure is the same as shown in FIG. 5a util step 204. In step 205, a number of time domains are identified in the recorded power signal, which are assignable to certain part processes of the apparatus according to design considerations. In step 207, a similar adaptation process as in step 206 of FIG. 5a takes place. However, in step 207, the adaptation process is performed separately on each of the determined time domains. This reduces the complexity of the adaptation process.

The method and devices according to the present invention are useful in many different applications. One example of an apparatus, which will benefit from the present invention, is a motor operated valve—MOV. Valves controlling different industrial processes are often positioned in hazardous environments. At the same time, a small error in a valve may lead to large production losses and thereby large costs. Another, more specific, example would be an apparatus controlling the positioning of control rods in a nuclear power plant. Here, the environment is highly unfriendly and any stops for correcting faults represent large amount of lost money.

It should, however, be noted that the present invention is more generally applicable, and can be used in a wide range of mechanical apparatuses. The specific model used for the different apparatuses has of course to be tailored to each specific case and design. However, the models are based on basic physical theory concerning mechanics, thermodynamics, fluid mechanics and electric theory and the model construction would not cause any difficulties for anyone well trained in the art of mechanics. The benefits of the present invention is, however, strongly dependent on the level of sophistication of the model.

A few examples of components that are easily described in a model are given here below.

Gears are typically designed to transform angular velocity and torque in a continuous way. As a consequence it is necessary to allow for sliding in between the teeth. Since the sliding takes place under different normal directions, there will be an angular dependent friction loss due to the sliding. This means that there is a time dependent power signal whose amplitude is proportional to the friction work done. The friction work is dependent on the transferred torque and the friction coefficient. Conclusions may be made on the status of the lubrication. If the surfaces of the teeth are worn, there will be both a change in the transfer of the angular velocity (and in the torque) and the angular dependent friction will show a slightly different pattern. Hence, it is possible to discover and to a certain extent also analyse such worn surfaces. In the same way, a change in wheel distance will cause a different pattern.

Many mechanical processes are considered as more or less time independent in a first glance, but since the present invention has demonstrated that quite detailed mechanical processes can be resolved, such processes may in a micro scale possess time dependent phenomena. Examples are ball bearings, where there is a continuous deformation of both the balls and the lane, which eventually result in material fatigue. If there is damage, for instance in the lane of the balls, the loading process of the balls will be altered and the subsequent transient will be larger in magnitude. In a similar way, grains will cause transients every time a ball (or roller) passes the grain.

In valves, a part of the power delivered by the driving motor is used to drive the stem through the tightening. If the stem is cylindrical, dynamic friction processes will take place. This may result in that the tightening is "screaming", a process that will cause a periodic need of power from the motor. When the slide goes into the seat, it will "touch" the surfaces and hence cause friction and increased need for power.

In a first stage of building a model, an ideal operation of the apparatus is considered. The total operation is followed and the motion of the different components is followed, in particular concerning frictional contacts, contact changes, changes in dimensions etc. From such an ideal operation, a relatively simple model can be obtained. The information obtained by the present invention, using such an ideal operation model, is rather limited.

However, by introducing model portions that extend beyond a perfect ideal operation, certain parameters connected thereto can be monitored and deviations from normal can be detected. In e.g. a gear, a defect tooth may be identified, or a case of insufficient lubrication may be concluded. However, in many cases, deviations are not possible to assign to a certain component.

Therefore, in a second stage, the model is preferably extended to also incorporate usual or important fault situations. By having a parameter representing the magnitude or occurrence of the faulty operation, the non-ideal operation can be included in the same model and the same fitting procedure as the ideal operations. If an adapted fault magnitude parameter is given a value significantly differing from zero, the fault is present. One example of a non-ideal operation model component is e.g. a grain in a ball gearing. One parameter could be the size of the grain, and, if this parameter exceeds a certain level, a grain is considered to be present. Another example could be a valve with a slide that is moved in a slightly deviating angle from the ideal angle, and therefore causes friction against surfaces that normally are not involved. A parameter describing e.g. the angle deviation could be used to indicate if such a fault is present.

The details of the model are only limited by the sophistication of the model builder. Nevertheless, there are always errors that are not predicted and modelled. If, in the adaptation process, there is a significant discrepancy between the model power and the measured one, that can't be compensated by adapting the parameters of the present model, a fault is present. From characteristic details of the fault signal it is possible to predict or at least estimate its cause. The operator will get notified about the occurrence of such an unknown fault, and a manual evaluation has to be performed. One advantage with the present invention is that since the analysis is based on a model, the model can easily be improved and upgraded at any stage. No further sample recordings or similar procedures have to be performed, and the improved model can be used at once.

The model according to the present invention may sometimes also depend on certain external quantities. When opening or closing a valve, the existence or magnitude of the flow that is stopped will influence the model. In some cases, these parameters can be left to vary during the adaptation step and be considered as a normal model parameter. However, a more reliable model is achieved if these external quantities are included by collecting information from other sources or actually measured and provided to the adaptation routine as external parameters. The need and the possibilities of the provision of such external factors will strongly depend on the apparatus in question. Examples of external quantities, which can be of interest, are e.g. load, temperature, humidity, flow, friction, and electric parameters and properties.

The basic operation of the diagnosing method according to the present invention is based on non-associative analysis, but uses instead parameterised models. However, recordings of earlier power signals can be of benefit in certain situations. If the apparatus can be operated in different modes or at strongly differing external operating conditions, the same parameters can be used in models that are differing a lot in structure. One example could e.g. be the modes of closing and opening a valve, respectively. The same parameters are basically involved, but in slightly different relation. A parameter that is determined with a large uncertainty in one mode may be much easier to resolve in another mode. A comparison between adapted parameters of different operational modes is of interest in the analysis as this will deepen the insight in the processes.

A comparison between adapted parameters of the same operational mode, but at different occasions may also be of interest. By e.g. following the time evolution of a parameter over a longer time, e.g. wear can be detected in an early stage long before the wear leads to any fatal errors of the operation. It will even in some cases be possible to estimate a remaining lifetime of the component. Such information is of importance for an operator. By monitoring a number of crucial components, a maintenance work can be planned with an appropriate safety margin to breakdown. Furthermore, several components can be replaced at the same time, if the remaining life is short, thereby reducing the number of production stops.

In certain systems, the components of the apparatus could be designed in such a manner that they will give rise to substantially identical power loss signatures. In such systems, a unique adaptation of the parameters can not be reached. However, by introducing characteristic minor faults on purpose at each of the components, such a problem can be solved. A minor fault do not necessarily influence the actual operation of the apparatus, but may give some small unique signatures that can be detected by the power measurements. By comparing the amplitude of such intentional fault with intensities of the power signals that in a perfect set-up can not be resolved, the contribution from the different components can be determined. Note, however, that the introduced faults ideally should not influence the apparatus in such a manner that the operation or life times considerably are affected.

The present invention focuses on power loss signatures in the time domain, making use of aperiodic information. Many systems in prior art instead focus on information treatment in the frequency domain, i.e. after a Fourier transform. A Fourier transform is a transformation between time and frequency domain, but has also other inherent properties. A Fourier transform also includes a kind of averaging procedure, which means that aperiodic behaviours are suppressed. This feature is in prior art used to extract periodic features of interest, but will at the same time discard a lot of additional information. A frequency spectrum may therefore lack a lot of information, compared with a corresponding curve in time domain.

However, even if transformation forth and back between time and frequency domain will result in reduction of information, investigations in the frequency domain may be of value as a complement to the time domain analysis. Averaging and frequency filtering can, for instance, easily be performed by using transformation techniques. Noise, originating from the electric grid frequency may e.g. be removed.

Information provided to an operator upon an identification of a fault, or upon request, could be of very different types. Furthermore, other external information can also automatically be retrieved at such an occasion, to facilitate operator decisions. Non-exclusive examples of information types are e.g. identification of a defect component, type of defect, magnitude of defect, estimation of remaining time to emergency failure for the defect component as well as of other components, necessary spare parts for repairing, estimated cost of repairing, repairing instructions and estimated repairing time. Such information may be very valuable for scheduling purposes.

Technical status of a machine is a somewhat vague conception. In principle it can be defined as time to next failure. If a machine is composed by n component, the technical status can be written as:

$$TS = \mathrm{Min}(T_1, \ldots T_i, \ldots T_n)$$

where TS is the technical status and $T_i$ is time to failure for component i. The function Min resolves the shortest time of the listed items. The same function can be used for other measures on technical status, e.g. time to maintenance and, when service has been made, the time is reset.

Figure 6:
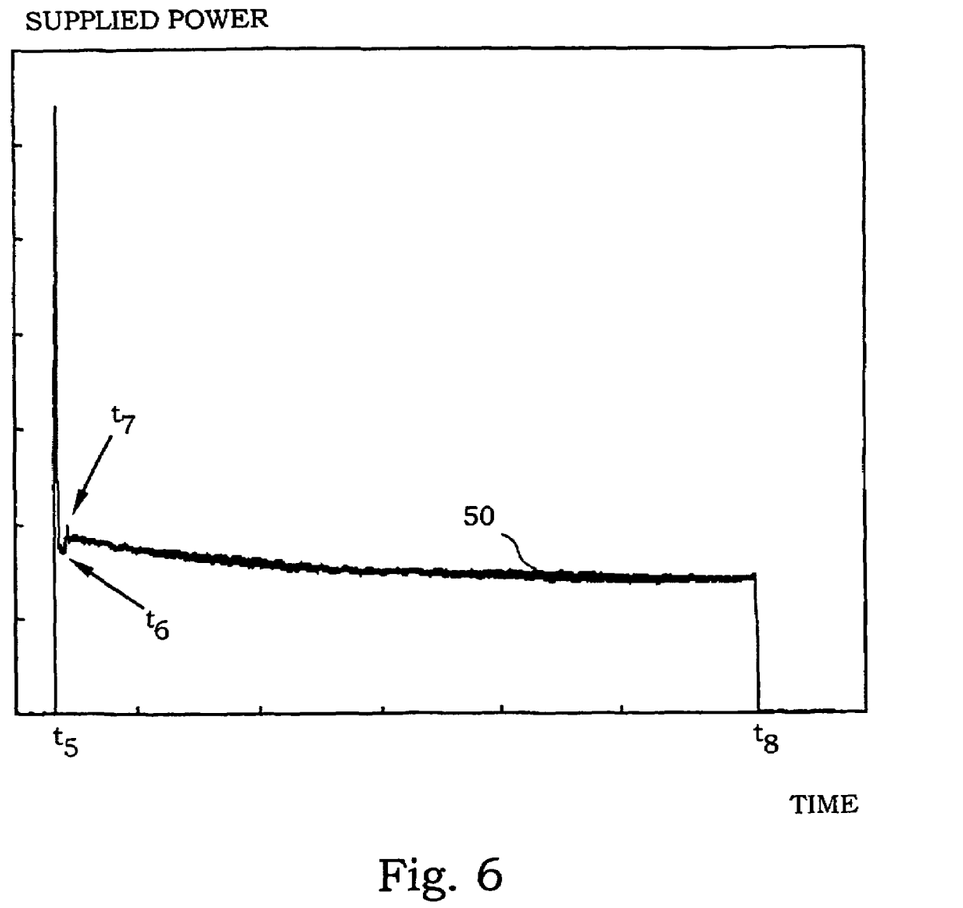
FIG. 6 is an illustration of a first measured power signal of an apparatus according to the present invention.

An illustrative real example of apparatus diagnosing will now be discussed. In this example, the application of the analytical and diagnostic procedure according to the present invention of a motor operated slide valve is demonstrated. The power supplied to the valve is measured by standard methods using voltage and current transformers and suitable data acquisition equipment. The supplied power is calculated from the acquired data. A typical result from a measurement is shown in FIG. 6 as a curve 50.

A dynamic physical power-flow model of the motor operated slide valve is created. All major information about the valve is determined by using the technical specifications and drawings.

The general course of events is easily identified in the time dependencies of the power consumption. From the left, the motor is started, followed by the catch of the play in the actuator, gearbox and stem nut. Thereafter the wedge is released from the seat and the wedge is transported away from the seat until a position switch stops the motor.

From the mechanical operation of the slide valve, a number of details in the process can be identified and modelled. When the preceding closing procedure stopped, the wedge was pushed into the seat and springs in the actuator were compressed. The force in stem holding the wedge in its position is locked by the friction in the thread of the nut and by the worm gear.

In the first part operation of the release of the slide valve, i.e. in a first operation phase, the motor is to catch the play in the gearbox, since the operation is reversed compared to the closing procedure. This play is usually very small. The next operation phase in the process is to release the worm in the worm gear that is loaded by the spring, in which the friction force is proportional to the turning angle. Until now no other parts have moved in the device.

When the worm is released from the spring it will catch the play in the worm gear. This phase of the operation will represent the lowest power in all the operation. The power is used only to turn the motor, the primary gear and its bearings to the input axis of the worm gear.

The next process or operation phase is when the actuator will catch the play from the worm gear to the nut. In this part, the friction in the worm gear will be added to the friction in the bearing of the clutch arrangement usually found in this part of an actuator.

The next process starts when turning the stem nut. The nut is loaded by the force once induced in the stem when the closing. The friction force in the thread prohibits the turning of the nut. To release the nut, the torque is increased. The applied power overcomes the friction power in the worm gear and compresses the springs in the actuator. That is, this part of the operation can be modelled from these two components only. The compression length of the springs is determined.

When the torque of the actuator is large enough to overcome the locking friction force in the stem nut the nut will be turned. Usually there is a play in the nut and bearings, but when released, the springs in the actuator will catch this play and the springs are released. This is a very fast process and limited only by the inertia in the gear. Moreover, if the play is small, springs will reverse the nut and start building up the torque in the nut (and the force in the stem) to release the wedge.

All these processes take place in the very beginning of the entire process, between the times $t_5$ and $t_6$. An expansion of this region will reveal details that can be identified as the different part operations above.

When the torque in the nut (and the force in the stem) is building up, the springs in the actuator are compressed. This can be identified as the sharp increase in supplied power at $t_7$. When the torque becomes high enough, the wedge is eventually released out from its position in the seat and the stem starts to move. In the very first part, the energy stored in the springs is released and will cooperate with the motor and move the stem with initially a high but decreasing speed. The friction power is the sum of the friction power in the nut and in the tightening and is also dependent on the velocity of the motion. The friction in the gearbox and the motor losses should be added as well. Hence, the power will be decrease until the excess energy in the springs is released and the stem goes into a constant velocity mode. This takes place in the first portion after the wedge release.

The following operation phase is the transport of the wedge to a fully open position, represented by $t_8$. The required power is here given by the friction in the tightening, the gearbox, and by the motor losses. This process thus corresponds to the main part of the measured supply of power. The processes here are dominated by rotating parts in the system. Therefore, the following part will focus on the rotating parts in the system.

The rotating parts of the actuator and the valve are composed by the rotor of the motor, the gearbox axis and wheels and the stem nut in conjunction with their bearings. The angle velocities are easily determined from the motor specification and gearbox ratios.

Design practise is to use standard evolvent tooth wheels, where the angular velocity of the outgoing axis is strictly proportional to the ingoing. That means there will be no oscillations in the transferred torque due to acceleration and retardation of the rotating inertia. There is, however, a sliding process between the teeth in the gear and this sliding will cause a periodic friction process due to changes in the geometric conditions when two teeth are in contact. If the loading torque is $T_{out}$, the required input torque $T_{in}$ to the gear is:

$$T_{in}(t)=T_{out}(t)\cdot(1+\mu_{g0}\cdot(1+f(t))),$$

where $\mu_{g0}$ is the friction coefficient in the gearbox and $f(t)$ represents the periodic variations. The function f can be calculated just from the shapes of the teeth. Hence, by following the oscillations in the torque, it is possible to determine the friction status of the gearbox as a whole.

Wear in a gearbox is usually related to deformation of the teeth or to a change in distance between the centres of the wheels due to wear in the bearings. Both these phenomena will result in a change in the geometric conditions and the characteristics of the friction function f as well.

It is simple matter to use a mathematical tool such as Fourier transform to identify the frequency of the function f as well as the power. If not pure harmonic overtones will be found in the spectrum, the produced spectrum will, however, lack in information since the angular frequency will depend on the load of the motor and the procedure will hence project only average information. This limitation can be overcome by comparing the measured signal with the expected in the time domain and it is possible to recover the properties of the periodic friction process in detail and even to follow it tooth for tooth. Moreover, a broken tooth can be identified.

Figure 7:
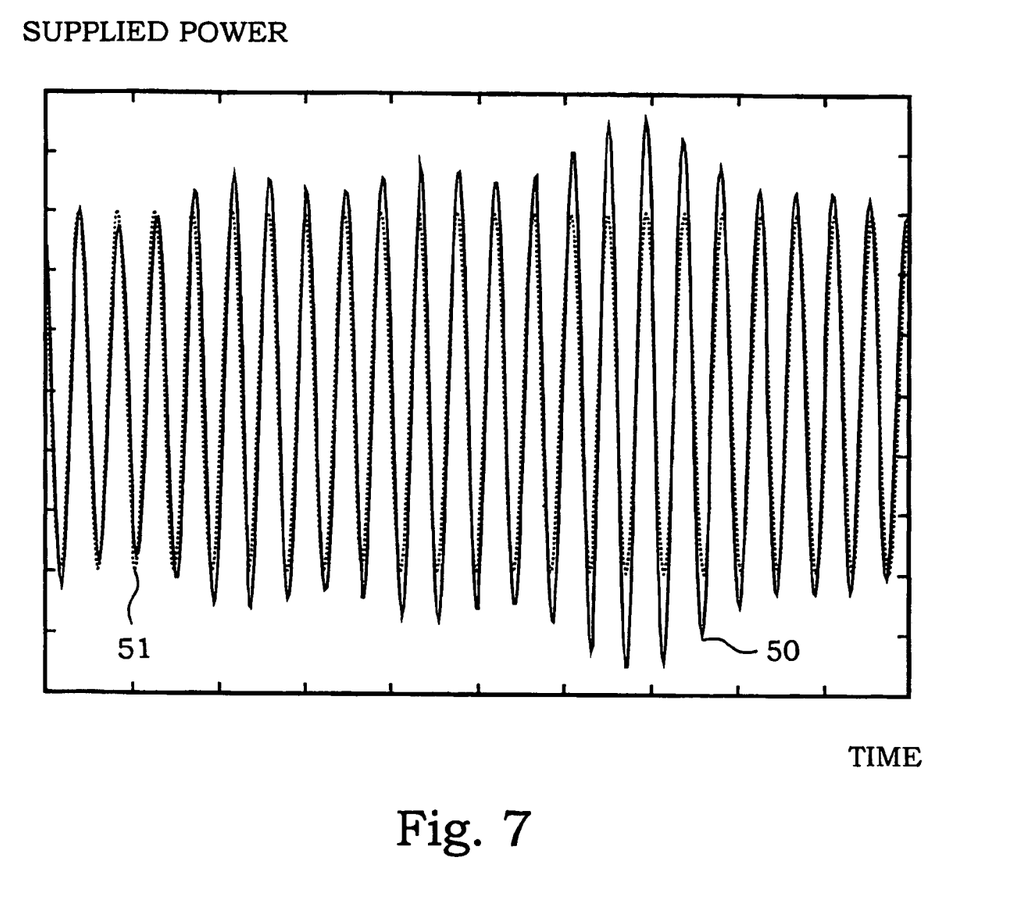
FIG. 7 is an illustration of a second measured power signal of an apparatus according to the present invention.

In FIG. 7, an enlarged portion of the part of the power signal of FIG. 6 associated with the worm gear is demonstrated. The full line 50 is the actually measured signal from the gear and the broken line 51 shows the expected (modelled) signal for an error-free operation. The time illustrated in FIG. 7 corresponds to one full turn of the tooth wheel. As can be seen there are both amplitude and phase changes as well as differences in the shape of the curves. This indicates that the wheel is slightly oval.

The analytical process for a ball or a roller bearing and the stem nut is very much the same.

In FIG. 6 it is obvious that the lowest power is found just before the stop of the manoeuvre, rather than at the very initial part when the play is caught and there are no motions present in the device. This indicates that the friction in the gearbox is reduced due to aggregation and self-heating of the grease in the gear.

As mentioned above, not only electrically driven apparatuses can make use of the present invention. The measured supplied power may for instance be a mechanical power, whereby the power meter is a mechanical power meter. The power transferred by rotating shafts, whereby applied torque and angular velocity is measured instantaneously, or quantities directly derivable therefrom. Suitable means for measuring the torque and angular velocity have to be provided. The supplied power will be calculated as the product of instantaneously determined torque and angular velocity. The power can alternatively be transferred by a translational motion, and in such a case, applied force and velocity is measured instantaneously, or quantities directly derivable therefrom. Suitable means for measuring the force and velocity have to be provided. The supplied power will be calculated as the product of force and velocity.

The measured supplied power may in other cases be a hydraulic or pneumatic power, whereby the power meter is a hydraulic or pneumatic power meter. The power can be transferred by fluids, whereby applied pressure and mass flow is measured instantaneously, or quantities directly derivable therefrom. Suitable means for measuring the pressure and flow have to be provided. The supplied power will be calculated as the product of pressure and flow.

It will be understood by those skilled in the art that various modifications and changes may be made to the present invention without departure from the scope thereof, which is defined by the appended claims.

The invention claimed is:

1. Diagnosing method for an apparatus having at least a first and a second movable mechanical component, both said at least a first and a second movable mechanical component influencing a power flow within said apparatus, comprising:
   measuring a total power supplied to said apparatus to obtain a power signal representing supplied power as a function of time;
   creating a dynamic physical power-flow model of said apparatus based on design considerations of dynamic interaction between said at least a first and a second movable mechanical components;
   said dynamic physical power-flow model representing a course of events, which at least to a part is aperiodic;
   said dynamic physical power-flow model being entirely described by model parameters directly connected to individual mechanical and/or electromagnetic quantities of said at least a first and a second movable mechanical components;
   adapting values of said model parameters in order to fit said dynamic physical power-flow model to signatures of said power signal; and
   diagnosing operation of said apparatus based on said adapted parameter values.

2. Diagnosing method according to claim 1, which further comprises:
   determining a number of part events of said dynamic physical power-flow model; and identifying time domains in said power signal corresponding to said part events;
whereby said adapting step is performed on signatures of said power signal within one time domain at a time.

3. Diagnosing method according to claim 1, wherein said dynamic physical power-flow model further comprises components being periodic time-dependent and/or static.

4. Diagnosing method according to claim 1, wherein said adapting step is performed for at least one aspect of said signatures selected from the list of:
occurrence time;
instantaneous amplitude;
instantaneous phase;
instantaneous power level;
position;
time evolution; and
duration.

5. Diagnosing method according to claim 1, wherein said adapting step in turn comprises assigning initial values of said model parameters according to an ideal operation of said apparatus, whereby said initial values become starting values of said adaptation.

6. Diagnosing method according to claim 1, wherein said dynamic physical power-flow model comprises ideal operation courses of events as well as known possible non-ideal operation courses of events caused by a fault, whereby a model parameter is connected to the occurrence and/or magnitude of said fault.

7. Diagnosing method according to claim 1, wherein said diagnosing step in turn comprises notifying an operator if any adapted model parameter value falls outside a pre-determined range.

8. Diagnosing method according to claim 7, wherein said notifying step in turn comprises displaying of at least one of the items in the list of:
identification of defect component;
type of defect;
magnitude of defect;
estimation of remaining time to emergency failure;
necessary spare parts for repairing;
estimated cost of repairing;
repairing instructions; and
estimated repairing time.

9. Diagnosing method according to claim 1, which further comprises:
providing information about external operational conditions, whereby said dynamic physical power-flow model comprises said external operational conditions.

10. Diagnosing method according to claim 9, wherein said external operation conditions are selected from the list of:
load;
temperature;
humidity;
flow;
friction; and
electric parameters and properties.

11. Diagnosing method according to claim 1, wherein said diagnosing step further comprises comparison with model parameters determined at operations of said apparatus at different conditions, internal and/or external.

12. Diagnosing method according to claim 1, wherein said diagnosing step further comprises evaluation of trends in sequences of power signals measured at similar conditions.

13. Diagnosing method according to claim 1, wherein said measured supplied power is an electrical power.

14. Diagnosing method according to claim 13, wherein said measuring step in turn comprises:

measuring instantaneous current supplied to said apparatus;
measuring instantaneous voltage supplied to said apparatus; and
calculating said supplied power as the product of said instantaneous current and said instantaneous voltage.

15. Diagnosing method according to claim 14, wherein said measuring step in turn comprises measuring instantaneous current and voltage in all three phases of a three-phase driven electromechanical apparatus.

16. Diagnosing method according to claim 1, wherein said measured supplied power is a mechanical power.

17. Diagnosing method according to claim 16, wherein said measuring step in turn comprises:
measuring instantaneous torque applied on said apparatus;
measuring instantaneous angular velocity supplied to said apparatus; and
calculating said supplied power as the product of said instantaneous torque and said instantaneous angular velocity.

18. Diagnosing method according to claim 16, wherein said measuring step in turn comprises:
measuring instantaneous force applied on said apparatus;
measuring instantaneous velocity supplied to said apparatus; and
calculating said supplied power as the product of said instantaneous force and said instantaneous velocity.

19. Diagnosing method according to claim 1, wherein said measured supplied power is a hydraulic or pneumatic power.

20. Diagnosing method according to claim 19, wherein said measuring step in turn comprises:
measuring instantaneous pressure supplied to said apparatus;
measuring instantaneous flow supplied to said apparatus; and
calculating said supplied power as the product of said instantaneous pressure and said instantaneous flow.

21. Diagnosing method according to claim 1, which further comprises:
identifying power signatures not possible to reproduce by said adapting step.

22. Diagnosing method according to claim 21, which further comprises:
notifying an operator if any non-reproducible power signature of substantial magnitude is identified.

23. Diagnosing method according to claim 1, which further comprises:
introducing a minor intentional fault in a component;
whereby a corresponding fault signature in said power signal is used to resolve contributions from components having similar signatures.

24. Diagnosing device for an apparatus having at least a first and a second movable mechanical component, both said at least a first and a second movable mechanical component influencing a power flow within said apparatus, said diagnosing device comprising:
a power meter measuring power supplied to said apparatus;
a processor connected to an output of said power meter, said processor in turn comprising means for obtaining a power signal representing supplied power as a function of time;
means for providing a dynamic physical power-flow model of said apparatus based on design considerations of dynamic interaction between said at least a first and a second movable mechanical components, said means for providing being connected to said processor;

said dynamic physical power-flow model representing a course of events, which at least to a part is aperiodic;

said dynamic physical power-flow model being entirely described by model parameters directly connected to individual mechanical and/or electromagnetic quantities of said at least a first and a second movable mechanical components;

said processor further comprising:

means for adapting values of said model parameters in order to fit said dynamic physical power-flow model to signatures of said power signal; and means for diagnosing operation of said apparatus based on said adapted parameter values.

25. Diagnosing device according to claim 24, further comprising means for notifying an operator connected to said processor, for presenting information associated with the diagnosis of said apparatus.

26. Diagnosing device according to claim 24, further comprising at least one sensor of an external operational conditions, an output of which being connected to said processor.

27. Diagnosing device according to claim 26, wherein said external operational condition is selected from the list of:
load;
temperature;
humidity;
flow;
friction; and
electric parameters and properties.

28. Diagnosing device according to claim 24, further comprising data storage means comprising said dynamic physical power-flow model stored therein, whereby said dynamic physical power-flow model is retrievable by said processor.

29. Diagnosing device according to claim 28, wherein said data storage means further comprises previous power signals and associated adapted parameters.

30. Diagnosing device according to claim 24, wherein said power meter is an electrical power meter.

31. Diagnosing device according to claim 30, wherein said power meter in turn comprises at least one sensor of instantaneous current and at least one sensor of instantaneous voltage.

32. Diagnosing device according to claim 31, wherein said power meter in turn comprises a sensor of instantaneous phase current and a sensor of instantaneous phase voltage of all phases to a three-phase electromagnetic apparatus.

33. Diagnosing device according to claim 24, wherein said power meter is a mechanical power meter.

34. Diagnosing device according to claim 33, wherein said power meter in turn comprises a sensor of instantaneous applied torque and a sensor of instantaneous supplied angular velocity.

35. Diagnosing device according to claim 33, wherein said power meter in turn comprises a sensor of instantaneous applied force and a sensor of instantaneous supplied velocity.

36. Diagnosing device according to claim 24, wherein said power meter is a hydraulic or pneumatic power meter.

37. Diagnosing device according to claim 36, wherein said power meter in turn comprises a sensor of instantaneous supplied pressure and a sensor of instantaneous supplied flow.

38. Apparatus comprising:

at least a first and a second movable mechanical component;

both said at least a first and a second movable mechanical component influencing a power flow within said apparatus; and a diagnosing device;

said diagnosing device in turn comprising:

a power meter measuring power supplied to said apparatus; and a processor connected to an output of said power meter;

said processor in turn comprising means for obtaining a power signal representing supplied power as a function of time;

means for providing a dynamic physical power-flow model of said apparatus based on design considerations of dynamic interaction between said at least a first and a second movable mechanical components, said means for providing being connected to said processor;

said dynamic physical power-flow model representing a course of events, which at least to a part is aperiodic;

said dynamic physical power-flow model being entirely described by model parameters directly connected to individual mechanical and/or electromagnetic quantities of said at least a first and a second movable mechanical components; and in that said processor further comprising:

means for adapting values of said model parameters in order to fit said dynamic physical power-flow model to signatures of said power signal; and means for diagnosing operation of said apparatus based on said adapted parameter values.

* * * * *